(12) United States Patent
Jiang et al.

(10) Patent No.: US 10,318,464 B1
(45) Date of Patent: Jun. 11, 2019

(54) MEMORY SYSTEM AND METHOD FOR ACCESSING MEMORY SYSTEM

(71) Applicant: MONTAGE TECHNOLOGY CO., LTD., Shanghai OT (CN)

(72) Inventors: Yibo Jiang, San Jose, CA (US); Gang Yan, San Jose, CA (US); Robert Xi Jin, San Jose, CA (US); Lizhi Jin, San Jose, CA (US); Leechung Yiu, San Jose, CA (US)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/022,660

(22) Filed: Jun. 28, 2018

(51) Int. Cl.
*G06F 13/16* (2006.01)
*G06F 13/40* (2006.01)

(52) U.S. Cl.
CPC ...... *G06F 13/4086* (2013.01); *G06F 13/1668* (2013.01); *G06F 13/4022* (2013.01)

(58) Field of Classification Search
CPC ............. G06F 13/4086; G06F 13/1668; G06F 13/4022
See application file for complete search history.

(56) References Cited

U.S. PATENT DOCUMENTS

| | | | | |
|---|---|---|---|---|
| 8,599,631 B2* | 12/2013 | Shaeffer | ................. | G11C 5/063 365/201 |
| 2011/0095783 A1* | 4/2011 | Ferolito | .............. | G06F 13/4086 326/30 |

(Continued)

*Primary Examiner* — Tim T Vo
*Assistant Examiner* — Phong H Dang
(74) *Attorney, Agent, or Firm* — Jun He Law Offices P.C.; James J. Zhu

(57) ABSTRACT

A memory system, comprising: a first plurality of memory ranks each having multiple memory cells; a second plurality of local controllers each coupled between one or more of the first plurality of memory ranks and a memory controller, the memory controller being configured to provide to a non-target local controller of the second plurality of local controllers, out of a first plurality of chip select (CS) signals, one or more non-target access CS signals disabling target access to one or more non-target memory ranks of the first plurality of memory ranks coupled to the non-target local controller; and the memory controller being further configured to provide to a target local controller of the second plurality of local controllers, out of the first plurality of CS signals, a target access CS signal enabling target access to a target memory rank of the first plurality of memory ranks coupled to the target local controller, and provide to the second plurality of local controllers a command and address (CA) signal for addressing and accessing the multiple memory cells of the target memory rank; and wherein the non-target local controller is configured to provide to the non-target memory ranks, in response to receiving the one or more non-target access CS signals, one or more composite on-die termination (ODT) instructions which instruct respective ones of the one or more non-target memory ranks to selectively switch on non-target DQ/DQS ODT for a data communication bus coupled between the first plurality of memory ranks and the memory controller at least for a period when the memory controller is performing target access to the target memory rank; wherein each composite ODT instruction comprises a combination of secondary CS instruction(s) and a secondary CA instruction.

20 Claims, 3 Drawing Sheets

(56) References Cited

U.S. PATENT DOCUMENTS

| | | | |
|---|---|---|---|
| 2011/0314200 A1* | 12/2011 | Wilson | G06F 13/4086 |
| | | | 710/316 |
| 2013/0163353 A1* | 6/2013 | Hiraishi | G11C 7/222 |
| | | | 365/193 |
| 2016/0028395 A1* | 1/2016 | Bains | H03K 19/0005 |
| | | | 326/30 |
| 2016/0291894 A1* | 10/2016 | Yeung | G06F 13/4068 |
| 2017/0069369 A1* | 3/2017 | Kim | G11C 11/4093 |
| 2017/0093400 A1* | 3/2017 | Bains | G06F 3/061 |
| 2017/0140809 A1* | 5/2017 | Mozak | G11C 11/4093 |
| 2017/0344051 A1* | 11/2017 | Patel | G06F 1/10 |
| 2017/0351460 A1* | 12/2017 | Oh | G06F 3/0604 |
| 2018/0342274 A1* | 11/2018 | Son | G11C 7/24 |

\* cited by examiner

MEMORY SYSTEM AND METHOD FOR ACCESSING MEMORY SYSTEM

TECHNICAL FIELD

The application generally relates to memory technology, and more particularly to a memory system and a method for accessing a memory system.

BACKGROUND

On-die termination (ODT) technology is a technology where termination resistors for impedance matching in transmission lines are located inside a semiconductor chip. ODT can reduce signal reflections resulting from signals which propagate along stub lines connecting a memory controller with components on a module card such as a dynamic random access memory (DRAM) module, thereby reducing unwanted noise introduced into the signals.

With the increase in operational frequency of memory systems, the ODT technology has been employed in memory modules such as DDR5 synchronous DRAM (SDRAM) modules. For example, ODT termination resistors may be selectively coupled to a command/address (CA) bus and/or to a data communication bus to switch on or off termination of these buses, thereby improving signal integrity thereof.

However, there is a need for further improvement to the existing memory systems.

SUMMARY

An objective of the present application is to provide a dynamic ODT mechanism for memory systems to improve performance of communicating data signals.

In an aspect of the present application, there is provided a memory system. The memory system, comprises: a first plurality of memory ranks each having multiple memory cells; a second plurality of local controllers each coupled between one or more of the first plurality of memory ranks and a memory controller, the memory controller being configured to provide to a non-target local controller of the second plurality of local controllers, out of a first plurality of chip select (CS) signals, one or more non-target access CS signals disabling target access to one or more non-target memory ranks of the first plurality of memory ranks coupled to the non-target local controller; and the memory controller being further configured to provide to a target local controller of the second plurality of local controllers, out of the first plurality of CS signals, a target access CS signal enabling target access to a target memory rank of the first plurality of memory ranks coupled to the target local controller, and provide to the second plurality of local controllers a command and address (CA) signal for addressing and accessing the multiple memory cells of the target memory rank; and wherein the non-target local controller is configured to provide to the non-target memory ranks, in response to receiving the one or more non-target access CS signals, one or more composite on-die termination (ODT) instructions instruct the one or more non-target memory ranks to selectively switch on non-target DQ/DQS ODT for a data communication bus coupled between the first plurality of memory ranks and the memory controller at least for a period when the memory controller is performing target access to the target memory rank; wherein each composite ODT instruction comprises a combination of secondary CS instruction(s) and a secondary CA instruction.

In some embodiments, each local controller is coupled to two memory ranks of the first plurality of memory ranks, and all of the first plurality of CS signals are two-clock cycle wide signals.

In some embodiments, the non-target local controller provides to the non-target memory ranks the secondary CS instructions via respective CS lines and the secondary CA instructions via respective CA output lines.

In some embodiments, the non-target local controller is further configured to generate, in response to receiving the non-target access CS signals, a non-target CA ODT instruction switching on non-target CA ODT at its CA input at least for a period when the non-target local controller is receiving the CA signal from the memory controller.

In some embodiments, the target local controller is configured to generate, in response to receiving the target access CS signal, a target CA ODT instruction switching on target CA ODT at its CA input at least for a period when the target local controller is receiving the CA signal from the memory controller.

In some embodiments, the memory controller is configured to provide to the second plurality of local controllers the CA signal N clock cycles later than the first plurality of CS signals to allow generation of the target CA ODT instruction before receiving of the CA signal, wherein N is a positive integer.

In some embodiments, N is a programmable value.

In some embodiments, each local controller is coupled to two memory ranks of the first plurality of memory ranks, and the target local controller is configured to generate the target CA ODT instruction when either or both of the two memory ranks are enabled for target access.

In some embodiments, the memory system comprises the memory controller.

In an embodiment, the memory system further comprises a second plurality of registering clock drivers (RCDs), and each of the second plurality of local controllers is integrated within one of the second plurality of RCDs.

In an embodiment, each of the second plurality of local controllers is integrated within one of the first plurality of memory ranks.

In another aspect of the present application, there is provided a method for access a memory system, wherein the memory system comprises a first plurality of memory ranks each having multiple memory cells, a second plurality of local controllers each coupled between one or more of the first plurality of memory ranks, and a memory controller; wherein the method comprises: providing from the memory controller to a non-target local controller of the second plurality of local controllers, out of a first plurality of CS signals, one or more non-target access CS signal disabling target access to one or more non-target memory ranks of the first plurality of memory ranks coupled to the non-target local controller; providing from the memory controller to a target local controller of the second plurality of local controllers, out of the first plurality of CS signals, a target access CS signal enabling target access to a target memory rank of the first plurality of memory ranks coupled to the target local controller; providing from the memory controller to the second plurality of local controllers a CA signal for addressing and accessing the multiple memory cells of the target memory rank; and providing from the non-target local controller to the non-target memory ranks, in response to receiving the one or more non-target access CS signals, one or more composite on-die termination (ODT) instructions which instruct respective ones of the one or more non-target memory ranks to selectively switch on non-target DQ/DQS ODT for a data communication bus coupled between the first plurality of memory ranks and the memory controller at least for a period when the memory controller is performing target access to the target memory rank; wherein each composite ODT instruction comprises a combination of secondary CS instruction(s) and a secondary CA instruction.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION OF THE EMBODIMENTS

Figure 1:
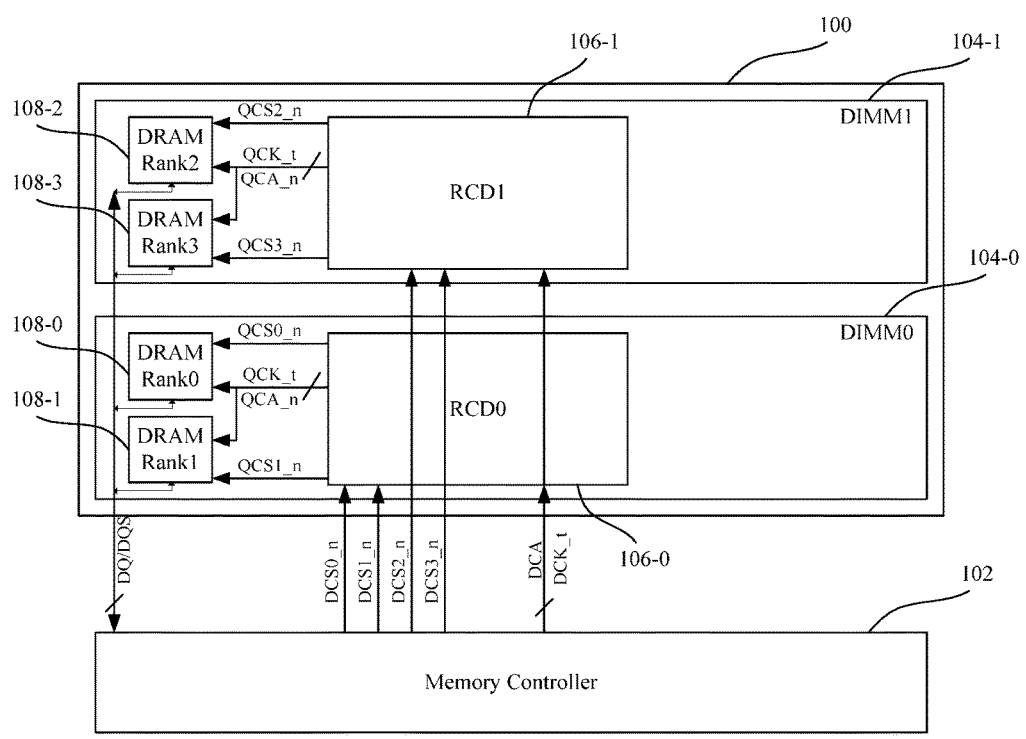
FIG. 1 shows a memory system 100 according to an embodiment of the present application.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed and other changes may be made without departing from the spirit or scope of the subject matter of the present application. It is to be understood that various configurations, substitutions, combinations and designs of the various forms of the present application, which are generally described in this application and are illustrated in the drawings, are intended to constitute a part of the present application.

FIG. 1 shows a memory system 100 according to an embodiment of the present application. The memory system 100 may be coupled to a memory controller 102 such as a central processing unit, to exchange data with the memory controller 102. Specifically, the memory controller 102 may access to the memory system 100 by providing, for example, a write instruction of writing data into the memory system 100, or a read instruction of reading data from the memory system 100. In certain embodiments, the memory system 100 may be a memory system in accordance with the JEDEC double data rate synchronous dynamic random access memory (DDR SDRAM) standard, including the JEDEC DDR2, DDR3, DDR4, DDR5, LPDDR3, LPDDR4, LPDDR5 or any other DDR standards, for example.

In an embodiment, as shown in FIG. 1, the memory system 100 includes a plurality of DIMM memory modules such as DIMM memory modules 104-0 and 104-1, which store data therein during operation. It can be appreciated that the number of the DIMM memory modules may be greater than 2 in other embodiments. Moreover, each DIMM memory module may include at least one DRAM memory rank, and a local controller such as a registering clock driver (RCD) coupled between the at least one DRAM memory rank and the memory controller 102. For example, the memory module 104-0 includes DRAM memory ranks 108-0 and 108-1, and an RCD 106-0. It can be appreciated that the number of DRAM memory ranks included in a memory module may be a positive integer other than 2 in other embodiments. The memory module 104-1 includes DRAM memory ranks 108-2 and 108-3, and an RCD 106-1. The local controller here refers to a control logic or circuit on the memory module, such as those disposed on a printed circuit board of the memory module and interfacing with the memory controller via a memory interface. In some embodiments, the local controller may be integrated within the RCD, or may not be integrated within the RCD. In some other embodiments, the local controller may be integrated with the memory ranks, such that the memory controller 102 can access to the memory ranks directly without buffering access commands and/or other control instructions via the RCD. In the following, the application will be elaborated with reference to the exemplary memory system 100 where the local controller is integrated within the memory modules, however, such description is for illustrative purpose only, and should not limit the scope of the application.

Specifically, the memory controller 102 is coupled to the RCDs (RCD 106-0 and RCD 106-1 in the embodiment shown in FIG. 1) via a DCA bus for providing a command/address (CA) signal which indicates specific access operation (e.g. write, read, select, deselect, etc.) instructions to the memory ranks, and a DCK_t clock bus for providing a clock signal for synchronizing the CA signal and some other signals provided to the RCDs 106-0 and 106-1. Both of the RCDs 106-0 and 106-1 have a CA input coupled to the DCA bus and for receiving the CA signal. The RCDs 106-0 and 106-1 may forward the received CA signal and clock signal to the memory ranks 108-0 to 108-3 via their respective QCA_n lines and QCK_t lines, to instruct to the memory ranks 108-0 to 108-3 how to proceed. It can be appreciated that the clock signal may be transmitted via the DCK_t bus and then the QCK_t lines, and in some other embodiments, the clock signal may be in form of a differential signal and can be transmitted via respective buses and signal lines.

In addition, the memory controller 102 is further coupled to the RCDs (RCD 106-0 and RCD 106-1 in the embodiment shown in FIG. 1) via respective DCSi_n (DCS0_n to DCS3_n in the embodiment shown in FIG. 1) lines for providing a set of chip select (CS) signals (not shown) thereto, wherein i is a positive integer. The CS signal may enable or disable target access to a specific memory rank of the plurality of memory ranks. For example, the RCD 106-0 is coupled to the memory controller 102 via the DCS0_n and DCS1_n lines. The RCDs 106-0 and 106-1 may further forward the received CS signals to the memory ranks 108-0 to 108-3 via respective QCSi_n lines (QCS0_n to QCS3_n in the embodiment shown in FIG. 1). Each memory rank is controlled by the CA signal on the QCA_n line and the CS signal on the corresponding QCSi_n line outputted by the RCD coupled thereto. During operation, a memory rank enabled for target access by the memory controller 102 via the corresponding RCD may be referred to as a target memory rank, the corresponding CS signal may be referred to as a target access CS signal, and the RCD coupled to the target memory rank may be referred to as a target RCD. It can be seen that, in the embodiment shown in FIG. 1, each RCD is coupled to two memory ranks. Accordingly, when either or both of the memory ranks coupled to a single RCD are enabled by the corresponding CS signals for target access, the RCD is a target RCD. On the other hand, a memory rank disabled for target access by the memory controller via the respective RCD may be referred to as a non-target memory rank, and the corresponding CS signal may be referred to as a non-target access CS signal. Accordingly, when both of the memory ranks coupled to an RCD are disabled by the corresponding CS signals for target access, the RCD may be referred to as a non-target RCD.

All the memory ranks 108-0 to 108-3 are further coupled to the memory controller 102 via a two-way data communication bus, i.e. a DQ/DQS bus, through which data can be written into the target memory rank during a write operation as instructed by the target RCD, or read from the target memory rank to the memory controller 102 during a read operation as instructed by the target RCD. JEDEC standards including DDR4 SDRAM (JESD79-4B) standard published in June 2017, DDR4 Registering Clock Driver-DDR4RCD01 (JESD82-31) standard published in August 2016, Low Power Double Data Rate 4 (JESD209-4B) standard published in February 2017 and etc. have provided more details regarding access operations for memory systems in accordance with the DDR standard, which are incorporated herein as their entirety by reference.

Since data communication between the memory modules 104-0 and 104-1 and the memory controller 102 may operate at a very high operational frequency such as 2400 MHz or higher, ODT can be applied to the signal buses (e.g. the DCA bus and the DQ/DQS bus) between the memory modules 104-0 and 104-1 and the memory controller 102 to improve signal integrity and reduce signal reflections on these buses. The inventors of the present application found that conventional memory systems with certain ODT capabilities does not work well during certain access operations. Accordingly, a new dynamic ODT mechanism is provided here, which can be implemented on the memory system 100 shown in FIG. 1, for example.

Figure 2:
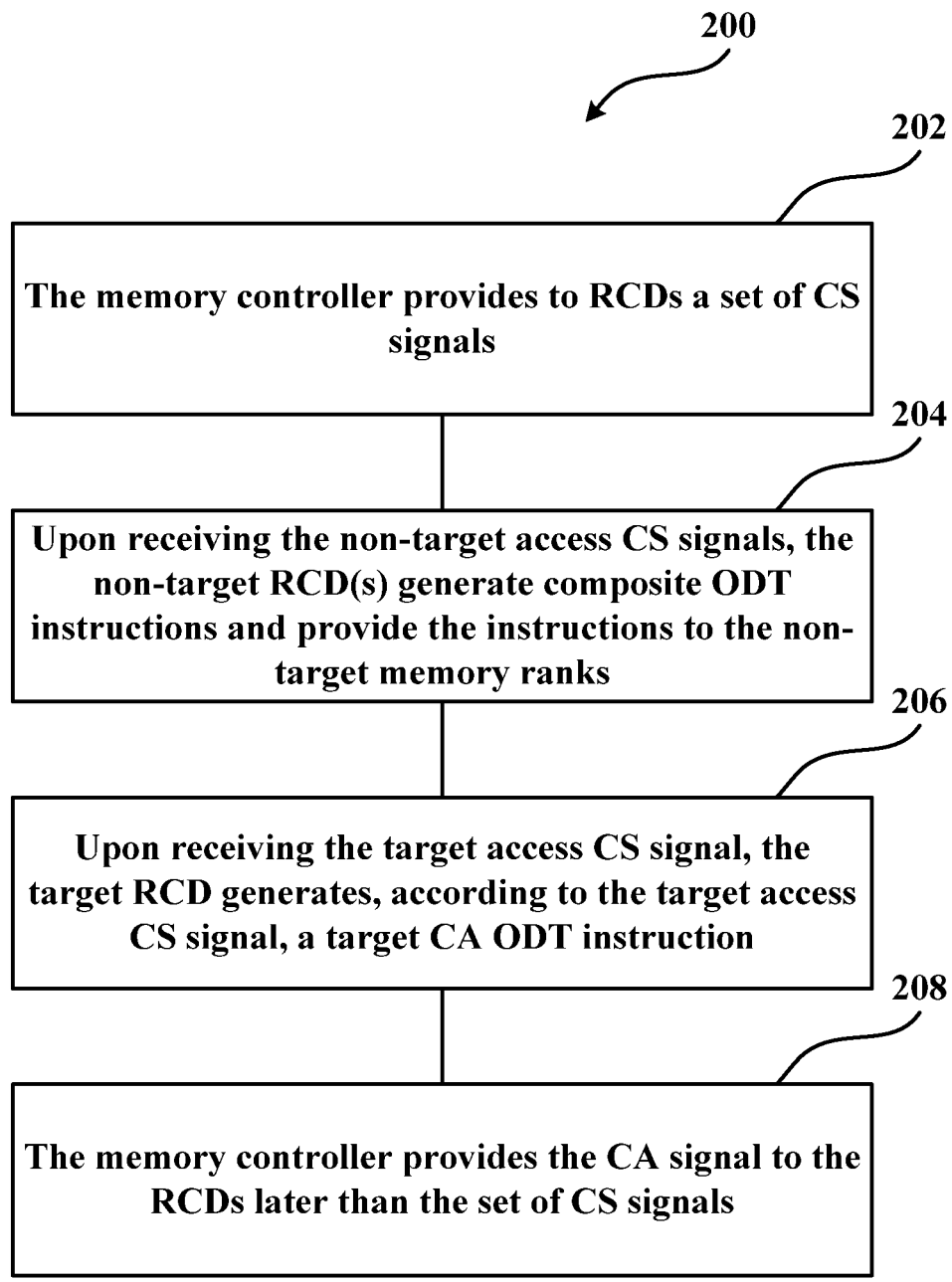
FIG. 2 shows a method 200 for accessing a memory system according to an embodiment of the present application.
Figure 3:
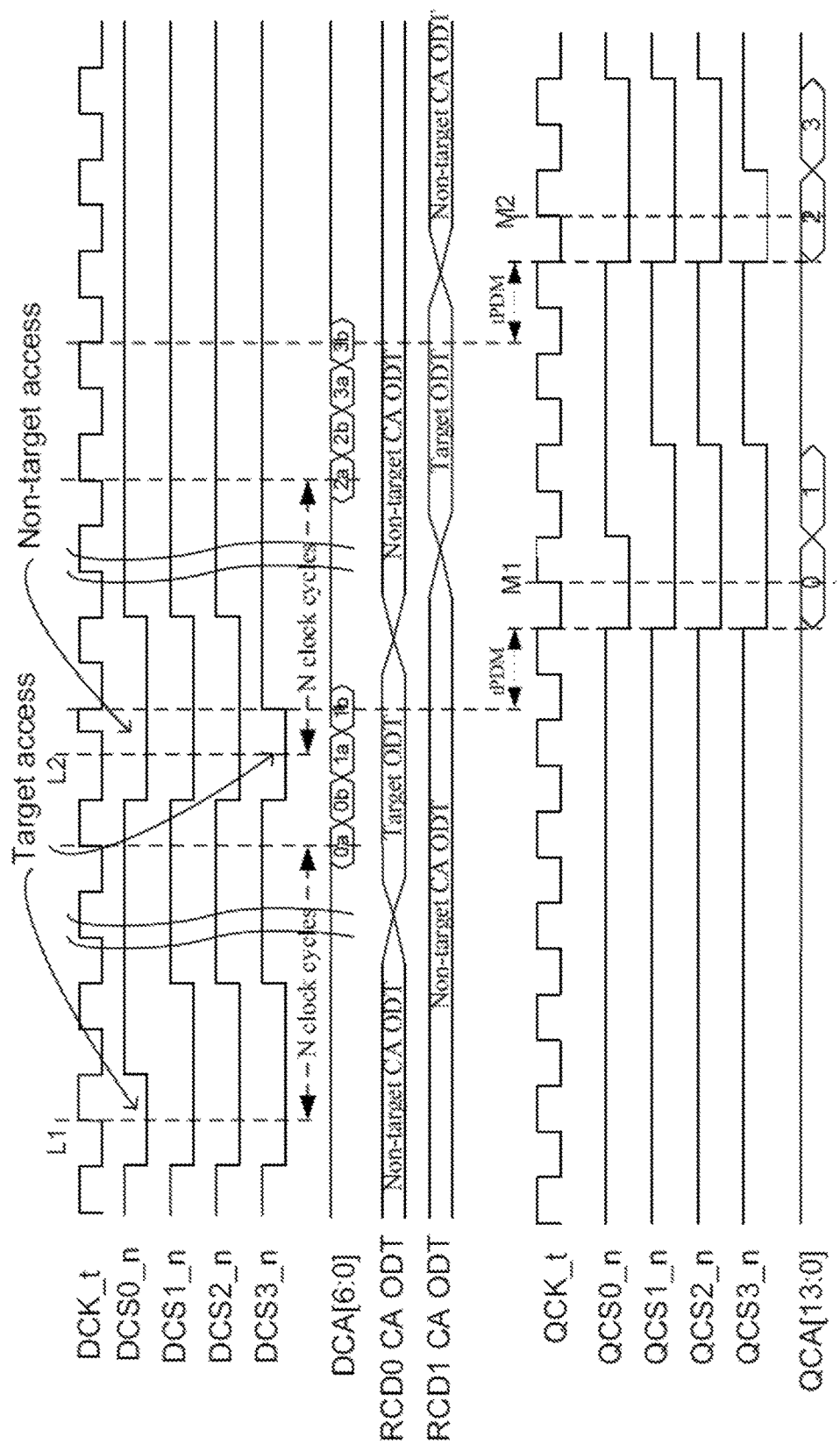
FIG. 3 shows an exemplary timing diagram for signals on a portion of the signal line/buses of the memory system shown in FIG. 1 according to the method shown in FIG. 2.

FIG. 2 shows a method 200 for accessing a memory system according to an embodiment of the present application. The method 200 employs dynamic ODT for a data communication bus and preferably further for a CA bus of the memory system 100 shown in FIG. 1. FIG. 3 shows a timing diagram for signals on a portion of the signal line/buses of the memory system 100 according to the method 200.

In the following, the method 200 will be elaborated with reference to FIGS. 1 to 3.

In particular, at step 202, a set of CS signals corresponding to the respective memory ranks 108-0 to 108-3 are provided from the memory controller 102 to the RCDs 106-0 and 106-1 via the DCSi_n lines. At time L1, the set of CS signals received include a target access CS signal targeting the target memory rank 108-0, and three non-target access CS signals for the non-target memory ranks 108-1 to 108-3. The non-target access CS signals may disable access to the non-target memory ranks 108-1 to 108-3. In the example shown in FIG. 3, the target access CS signal on the DSC0_n line is active low phase (the active level is low level while the inactive level is high level) when indicating target access to the target memory rank 108-0, while the other non-target access CS signals on the DCS1_n to DCS3_n lines maintain low for two clock cycles around time L1. It can be appreciated that the target access CS signal may be active high phase when indicating target access, for example, for a memory system in accordance with the LPDDR5 standard. The target access CS signal on the DCS0_n line may be forwarded to the target memory rank 108-0 at a later stage to enable target access to the target memory rank 108-0. Similarly, the non-target access CS signals on the DCS1_n to DCS3_n lines may be forwarded to the non-target memory ranks 108-1 to 108-3 later to disable target access to these memory ranks.

At step 204, upon receiving the non-target access CS signals, the non-target RCD(s) may generate a composite ODT instruction and provide the instruction to the non-target memory ranks coupled therewith. The composite ODT instruction then instructs the non-target memory ranks to selectively switch on non-target DQ/DQS ODT on the data communication bus (i.e. the DQ/DQS bus) at least for a period when the memory controller is performing target access to the target memory rank. The specific values or instructions carried by the composite ODT instruction may vary depending on different conditions, which will be elaborated below. In certain embodiments, the composite ODT may include secondary CS instruction(s) transmitted via CS lines (QCSi_n lines shown in FIG. 1) between the non-target RCD and the corresponding memory rank and a secondary CA instruction transmitted via CA lines (QCA_n lines shown in FIG. 1) between the non-target RCD and the corresponding memory rank. The secondary CS instruction may or may not be the same as the CS signal transmitted via the DCSi_n lines; and the secondary CA instruction may or may not be the same as the CA signal transmitted via the DCA lines.

For example, when the non-target RCD 106-1 receives two non-target access CS signals for both of the two non-target memory ranks 108-2 and 108-3 coupled thereto, it may provide to the two memory ranks 108-2 and 108-3 the composite ODT instruction. At the same time, the target RCD 106-0 receiving the target access CS signal may be instructing the target memory rank 108-0 to perform data communication with the memory controller 102 via the DQ/DQS bus. Thus, at least when the target memory rank 108-0 is communicating data with the memory controller 102 via the DQ/DQS bus, the non-target DQ/DQS ODT may be switched on for the DQ/DQS bus, to improve signal integrity on the DQ/DQS bus and reduce noise on the DQ/DQS bus.

In some embodiments, other than selectively enabling the non-target DQ/DQS ODT for the DQ/DQS bus coupled to the non-target memory ranks, the ODT mechanism can be further employed to the RCDs at their CA inputs to improve signal integrity on the CA bus. Specifically, at step 206, upon receiving the target access CS signal, the target RCD 106-0 may generate, according to the target access CS signal, a target CA ODT instruction to switch on target CA ODT at its CA input which is coupled to the DCA bus. The generation of the target CA ODT instruction is later than receiving of the target access CS signal since it is based on the received target access CS signal. For example, the target RCD which has received the target access CS signal may include a decoder. The decoder may decode the target access CS signal into the target CA ODT instruction for switching on the target CA ODT. In certain embodiments, the dynamic ODT mechanism can also be employed to the CA inputs of the non-target RCD(s). Specifically, when a non-target RCD has received the non-target access CS signals, the decoder of the non-target RCD may decode the non-target access CS signals into a non-target CA ODT instruction for switching on non-target CA ODT for its CA input. The target CA ODT and the non-target CA ODT are both ODT for the CA bus, with a difference in the resistance of the termination resistor switched to for termination. In the embodiment shown in FIG. 1, the target CA ODT instruction may be an internal instruction of the target RCD(s) and not be provided to other components such as the target memory rank(s). In some other embodiments where the local controller is not integrated within the RCD or is integrated within the memory rank, the decoder may be formed with other components of the local controller as an individual sub-module of the memory module, or may be integrated within the memory rank; and accordingly, the target CA ODT can be provided to the CA inputs of these components to switch on the target CA ODT for these components. The non-target CA ODT instruction may be similarly an internal instruction of the non-target RCD(s).

outputting the CA signal buffered, as is shown in FIG. 3. Accordingly, the CA signal may carry four bits on each signal line of the DCA[6:0] bus during each two cycles (i.e. two bits for each cycle including one bit in the first half and another bit in the second half) to ensure that a total of at most 28 bits can be outputted to the corresponding memory rank via the QCA[13:0] bus of the RCD. It should be noted that the number of signal lines included in a CA bus (DCA/QCA) does not limit the scope of the application.

As shown in Table I, when a value of "10" is received on either or both of the DCS0_n and the DCS1_n line within two consecutive clock cycles, such CS signal is illegal. Other than those illegal combinations, when a value "01" is received on the DCS1_n line within two consecutive clock cycles, a target access to the memory rank 108-1 will be performed; and when a value "01" is received on the DCS0_n line within two consecutive clock cycles, a target

TABLE I

Full Combination of DCS0_n and DCS1_n Coding

| DCS0_n | | DCS1_n | | Legal | | |
|---|---|---|---|---|---|---|
| 1st cycle | 2nd cycle | 1st cycle | 2nd cycle | or Illegal | DCA ODT value | Note |
| 0 | 0 | 0 | 0 | Legal | Non-target CA ODT | Non-target access |
| 0 | 0 | 0 | 1 | Legal | Target CA ODT | Target access to Rank1 |
| 0 | 0 | 1 | 0 | Illegal | N/A | N/A |
| 0 | 0 | 1 | 1 | Legal | Non-target CA ODT | Non-target access |
| 0 | 1 | 0 | 0 | Legal | Target CA ODT | Target access to Rank0 |
| 0 | 1 | 0 | 1 | Legal | Target CA ODT | Target access to both Rank0 and Rank1 |
| 0 | 1 | 1 | 0 | Illegal | N/A | N/A |
| 0 | 1 | 1 | 1 | Legal | Target CA ODT | Target access to Rank0 |
| 1 | 0 | 0 | 0 | Illegal | N/A | N/A |
| 1 | 0 | 0 | 1 | Illegal | N/A | N/A |
| 1 | 0 | 1 | 0 | Illegal | N/A | N/A |
| 1 | 0 | 1 | 1 | Illegal | N/A | N/A |
| 1 | 1 | 0 | 0 | Legal | Non-target CA ODT | Non-target access |
| 1 | 1 | 0 | 1 | Legal | Target CA ODT | Target access to Rank1 |
| 1 | 1 | 1 | 0 | Illegal | N/A | N/A |
| 1 | 1 | 1 | 1 | Legal | Non-target CA ODT | Non-target access |

Table I above shows a full combination of DCS0_n and DCS1_n coding for the memory system shown in FIG. 1. Both of the DCS0_n and DCS1_n lines are coupled to the RCD 106-0 shown in FIG. 1. And the memory system is a memory system in accordance with the DDR5 standard and other future DDR standards where the CS signal is a two-clock wide signal and active low phase. The CA signal may also be a two-clock cycle wide signal, with each signal line of the CA bus transmitting one-bit data during each clock cycle. For a memory system without an RCD for buffering the CA signal, i.e. memory modules of the memory systems are directly accessed by the memory controller, each memory module may have a CA[13:0] bus having 14 signal lines, and thus a total of at most 28 bits can be transmitted via the CA[13:0] bus during each two clock cycles. The at most 28 bits data forms the data access instruction and access address required for a data access operation. Moreover, the CS signal and the CA signal, both of which are two-clock cycle wide signals, can be aligned to the clock signal provided at the DCK_t bus respectively, to pass necessary chip select instruction, data access instruction, access address and etc. to the memory module. For a memory system with an RCD, as is shown in FIG. 1, the RCD may have a DCA[6:0] bus for receiving the CA signal from the memory controller and a QCA[13:0] bus for access to the memory rank 108-0 will be performed. In such condition, the target CA ODT may be switched on for the RCD 106-0.

Furthermore, when a value "00" or "11" is received on both of the DCS0_n and DCS1_n lines within two consecutive clock cycles, e.g. at time L2 in FIG. 3, a non-target access to the memory ranks 108-0 and 108-1 will be performed. There are four possible combinations of the coding on two DCSi_n lines if received within two clock cycles, including "0000", "1111", "0011" and "1100". Any of the four combinations can be utilized for generation of the composite ODT instruction. In some embodiments, the composite ODT instruction may carry two instructions, including a first instruction for enabling non-target DQ/DQS ODT for the DQ/DQS bus accompany with a read command, and a second instruction for enabling non-target DQ/DQS ODT for the DQ/DQS accompany with a write command. The read command or the write command of the composite ODT instruction for the non-target memory rank corresponds to the specific type of target access to the target memory rank provided in the CA signal. Also, the CA signal forwarded to the target memory rank by the target RCD also corresponds to that provided in the CA signal from the memory controller.

TABLE II

| CS Coding for Non-Target RCD | | | | | | | | | |
|---|---|---|---|---|---|---|---|---|---|
| DCS0_n | | DCS1_n | | QCS0_n | | QCS1_n | | | DCA |
| 1st cycle | 2nd cycle | 1st cycle | 2nd cycle | 1st cycle | 2nd cycle | 1st cycle | 2nd cycle | QCA | ODT value |
| Combination 1 = "1111" | | | | 1 | 1 | 1 | 1 | DES | Non-target |
| Combination 2 = "0011" | | | | 0 | 0 | 0 | 0 | RD | target |
| Combination 3 = "1100" | | | | 0 | 0 | 0 | 0 | WR | ODT |

Table II shows exemplary CS coding for the non-target RCD 106-0. As shown in Table II, the non-target RCD 106-0 may receive a first combination "1111" at its DCS0_n and DCS1_n inputs, and accordingly the non-target RCD 106-0 may generate a composite ODT instruction with a combined value "1111" at its QCS0_n and QCS1_n outputs (within two clock cycles) and "DES (deselect)" at its QCA output. In response to such composite ODT instruction, the non-target memory ranks 108-0 and 108-1 may take no action. Moreover, when the non-target RCD 106-0 receives a second combination "0011" at its DCS0_n and DCS1_n inputs, and accordingly the non-target RCD 106-0 may generate a composite ODT instruction with a combined value "0000" at its QCS0_n and QCS1_n outputs (within two clock cycles) and "RD (read)" at its QCA output. In response to such composite ODT instruction, the non-target memory ranks 108-0 and 108-1 may provide non-target ODT_NOM_RD value on the DQ/DQS bus to enable the DQ/DQS ODT. Similarly, when the non-target RCD 106-0 receives a third combination "1100" at its DCS0_n and DCS1_n inputs, and accordingly the non-target RCD 106-0 may generate a composite ODT instruction with a combined value "0000" at its QCS0_n and QCS1_n outputs (within two clock cycles) and "WR (write)" at its QCA output. In response to such composite ODT instruction, the non-target memory ranks 108-0 and 108-1 may provide non-target ODT_NOM_WR value on the DQ/DQS bus to enable the DQ/DQS ODT. The datasheet for DDR4 or DDR5 standard can be referred to for more details of the non-target ODT_NOM_RD and non-target ODT_NOM_WR values.

It should be noted that, although Table II shows that three of four candidate combinations "0000", "0011", "1100" and "1111" can be used for generating the composite ODT instruction carrying specific instructions and/or values, such selection and association may be adjusted in other embodiments. For example, in some embodiments, another three of the four candidate combinations can be used, or the three combinations can be associated with the three values of the composite ODT instruction in another order. Also in some other embodiments, only two of the four candidate combinations can be used to generate the composite ODT instructions carrying the non-target ODT_NOM_WR value or the non-target ODT_NOM_RD value.

It can be appreciated that, during the non-target access, the non-target RCD may also switch on the non-target CA ODT for its DCA input, as is shown in Table 2.

As mentioned above, the generation of the target CA ODT instruction, the non-target CA ODT instruction and the composite ODT instruction by the respective RCDs all require some time for decoding or the like. In order to allow sufficient time for the RCDs and the memory ranks to get prepared for access by the memory controller, in some embodiments, a CA signal for addressing and accessing the multiple memory cells of the target memory rank may be provided from the memory controller to the RCDs via the DCA bus, later than the target access CS signal and the non-target CS signals, as is shown in step 208.

Specifically, if the CA signal is transmitted from the memory controller to the target RCD simultaneously with the CS signals, at least at the beginning of the target RCD receiving the CA signal, the non-target DQ/DQS ODT and the target/non-target CA ODT cannot be activated, which may introduce unwanted noise into the memory system. Thus, at step 208, the CA signal is provided later than the target access CS signal, to allow sufficient time for the target RCD to generate the target CA ODT instruction, and the CA signal is also provided later than the non-target CS signal, such that the non-target DQ/DQS ODT can be switched on for the non-target memory ranks. For example, as shown in FIG. 3, the CA signal may be provided to the RCDs N clock cycles (of the clock signal on the DCK_t bus) later than the CS signals on the respective DSCi_n lines, wherein N is a positive integer. In some examples, N may be a programmable value, which is programmable according to a processing capability of the RCDs of the memory system. For example, if the RCDs have stronger signal processing capability, then N can be set to be a smaller value; otherwise N may be set to be a bigger value to allow sufficient time for processing of the RCDs.

In this way, the receiving of the CA signal by the RCDs should be always no earlier than switching on the target CA ODT for the target RCD. Furthermore, these ODT mechanisms should be maintained active at least for a period covering receiving of the CA signal by the RCDs. In some preferred embodiments, the target CA ODT instruction may switch on the target CA ODT for the target RCD a setup time prior to the receiving of the CA signal by the RCD till a hold time after the receiving of the CA signal.

As described above, an RCD may receive non-target access CS signals at all its DCSi_n inputs, and accordingly the RCD is a non-target RCD. For the non-target RCD, the non-target CA ODT may be switched on at its CA input, as is shown in FIG. 3. In some embodiments, the non-target CA ODT may be set as default ODT and be switched on unless a target access CS signal is received. As shown in FIG. 3, except the target CA ODT switched on for receiving of the CA signal, the CA ODT is set as the non-target CA ODT.

In the embodiment shown in FIG. 3, both the target access CS signal and the non-target access CS signals are two-clock cycle wide, which is in accordance with the DDR5 standards for example. It can be appreciated that the method can be used for memory systems in accordance with other DDR standards such as the LPDDR5 standard. Specifically, in LPDDR5 memory systems, the target access and non-target access CS signals are one-clock cycle signals and active high phase. The CA signal is also transmitted within a clock cycle. The target CA ODT and non-target CA ODT setting for the memory system is similar to that of the memory system shown in FIG. 3, which will not be elaborated herein.

It should be noted that although several steps of the method for accessing a memory system and several modules or sub-modules of a memory system are described in the above description, this division is merely exemplary rather than mandatory. In fact, according to the embodiments of the present application, features and functions of two or more modules described above may be embodied in one module. Conversely, features and functions of one module described above can be further divided into a plurality of modules.

Those skilled in the art will be able to understand and implement other variations to the disclosed embodiments by studying the specification, the application, the drawings and the appended claims. In the claims, the words "include" or "including" do not exclude other elements and steps, and the words "a" or "an" do not exclude the plural. In the practical application of the present application, one part may perform the functions of a plurality of technical features cited in the claims. Any reference numerals in the claims should not be construed as limiting the scope.

What is claimed is:

1. A memory system, comprising:
a first plurality of memory ranks each having multiple memory cells;
a second plurality of local controllers each coupled between one or more of the first plurality of memory ranks and a memory controller,
the memory controller being configured to provide to a non-target local controller of the second plurality of local controllers, out of a first plurality of chip select (CS) signals, one or more non-target access CS signals disabling target access to one or more non-target memory ranks of the first plurality of memory ranks coupled to the non-target local controller; and
the memory controller being further configured to provide to a target local controller of the second plurality of local controllers, out of the first plurality of CS signals, a target access CS signal enabling target access to a target memory rank of the first plurality of memory ranks coupled to the target local controller, and provide to the second plurality of local controllers a command and address (CA) signal for addressing and accessing the multiple memory cells of the target memory rank; and
wherein the non-target local controller is configured to provide to the non-target memory ranks, in response to receiving the one or more non-target access CS signals, one or more composite on-die termination (ODT) instructions which instruct respective ones of the one or more non-target memory ranks to selectively switch on non-target DQ/DQS ODT for a data communication bus coupled between the first plurality of memory ranks and the memory controller at least for a period when the memory controller is performing target access to the target memory rank; wherein each composite ODT instruction comprises a combination of secondary CS instruction(s) and a secondary CA instruction.

2. The memory system of claim 1, wherein each local controller is coupled to two memory ranks of the first plurality of memory ranks, and all of the first plurality of CS signals are two-clock cycle wide signals.

3. The memory system of claim 1, wherein the non-target local controller provides to the non-target memory ranks the secondary CS instructions via respective CS lines and the secondary CA instructions via respective CA output lines.

4. The memory system of claim 1, wherein the non-target local controller is further configured to generate, in response to receiving the non-target access CS signals, a non-target CA ODT instruction switching on non-target CA ODT at its CA input at least for a period when the non-target local controller is receiving the CA signal from the memory controller.

5. The memory system of claim 1, wherein the target local controller is configured to generate, in response to receiving the target access CS signal, a target CA ODT instruction switching on target CA ODT at its CA input at least for a period when the target local controller is receiving the CA signal from the memory controller.

6. The memory system of claim 5, wherein the memory controller is configured to provide to the second plurality of local controllers the CA signal N clock cycles later than the first plurality of CS signals to allow generation of the target CA ODT instruction before receiving of the CA signal, wherein N is a positive integer.

7. The memory system of claim 6, wherein N is a programmable value.

8. The memory system of claim 1, wherein each local controller is coupled to two memory ranks of the first plurality of memory ranks, and the target local controller is configured to generate the target CA ODT instruction when either or both of the two memory ranks are enabled for target access.

9. The memory system of claim 1, wherein the memory system further comprises a second plurality of registering clock drivers (RCDs), and each of the second plurality of local controllers is integrated within one of the second plurality of RCDs.

10. The memory system of claim 1, wherein each of the second plurality of local controllers is integrated within one of the first plurality of memory ranks.

11. A method for accessing a memory system, wherein the memory system comprises a first plurality of memory ranks each having multiple memory cells, a second plurality of local controllers each coupled between one or more of the first plurality of memory ranks, and a memory controller; wherein the method comprises:
providing from the memory controller to a non-target local controller of the second plurality of local controllers, out of a first plurality of chip select (CS) signals, one or more non-target access CS signal disabling target access to one or more non-target memory ranks of the first plurality of memory ranks coupled to the non-target local controller;
providing from the memory controller to a target local controller of the second plurality of local controllers, out of the first plurality of CS signals, a target access CS signal enabling target access to a target memory rank of the first plurality of memory ranks coupled to the target local controller;
providing from the memory controller to the second plurality of local controllers a command and address (CA) signal for addressing and accessing the multiple memory cells of the target memory rank; and
providing from the non-target local controller to the non-target memory ranks, in response to receiving the one or more non-target access CS signals, one or more composite on-die termination (ODT) instructions which instruct respective ones of the one or more non-target memory ranks to selectively switch on non-target DQ/DQS ODT for a data communication bus coupled between the first plurality of memory ranks and the memory controller at least for a period when the memory controller is performing target access to the target memory rank; wherein each composite ODT instruction comprises a combination of secondary CS instruction(s) and a secondary CA instruction.

12. The method of claim 11, wherein each local controller is coupled to two memory ranks of the first plurality of memory ranks, and all of the first plurality of CS signals are two-clock cycle wide signals.

13. The method of claim 11, wherein the secondary CS instructions are provided from the non-target local controller to the non-target memory ranks via respective CS lines and the secondary CA instructions are provided from the non-target controller to the non-target memory ranks via respective CA output lines.

14. The method of claim 11, further comprising:
generating, via the non-target local controller and in response to receiving the non-target access CS signals, a non-target CA ODT instruction switching on non-target CA ODT at a CA input of the non-target local controller at least for a period when the non-target local controller is receiving the CA signal from the memory controller.

15. The method of claim 11, further comprising:
generating, via the target local controller and in response to receiving the target access CS signal, a target CA ODT instruction switching on target CA ODT at an CA input of the target local controller at least for a period when the target local controller is receiving the CA signal from the memory controller.

16. The method of claim 15, wherein the CA signal is provided to the second plurality of local controllers N clock cycles later than the first plurality of CS signals to allow generation of the target CA ODT instruction before receiving of the CA signal, wherein N is a positive integer.

17. The method of claim 16, wherein N is a programmable value.

18. The method of claim 11, wherein each local controller is coupled to two memory ranks of the first plurality of memory ranks, and the target local controller is configured to generate the target CA ODT instruction when either or both of the two memory ranks are enabled for target access.

19. The method of claim 11, wherein the memory system further comprises a second plurality of registering clock drivers (RCDs), and each of the second plurality of local controllers is integrated within one of the second plurality of RCDs.

20. The method of claim 11, wherein each of the second plurality of local controllers is integrated within one of the first plurality of memory ranks.

* * * * *